United States Patent [19]

Morita et al.

[11] Patent Number: 4,880,882

[45] Date of Patent: Nov. 14, 1989

[54] CURABLE RESIN COMPOSITION CONTAINING A MICROPARTICULATE SILICONE RUBBER

[75] Inventors: Yoshitsugu Morita; Noriyasu Yokoyama; Keiji Yoshida, all of Chiba, Japan

[73] Assignee: Toray Silicone Company, Ltd., Tokyo, Japan

[21] Appl. No.: 234,242

[22] Filed: Aug. 19, 1988

[30] Foreign Application Priority Data

Aug. 21, 1987 [JP] Japan .................................. 62-207583

[51] Int. Cl.$^4$ .............................................. C08F 20/00
[52] U.S. Cl. ...................................... 525/446; 524/277; 524/806; 524/860; 524/861; 525/472; 525/476; 525/477
[58] Field of Search ............... 524/277, 806, 860, 861; 525/446, 472, 476, 477

[56] References Cited

U.S. PATENT DOCUMENTS

| | | | |
|---|---|---|---|
| 4,624,998 | 11/1986 | Keil | 525/476 |
| 4,663,397 | 5/1987 | Morita et al. | 525/476 |
| 4,749,765 | 6/1988 | Shimizu et al. | 528/15 |
| 4,761,454 | 8/1988 | Oba et al. | 524/861 |
| 4,778,860 | 10/1988 | Morita et al. | 525/476 |

OTHER PUBLICATIONS

Abstract of Japanese Patent Application 52-14643.
Abstract of Japanese Patent Application 58-219218.

*Primary Examiner*—Melvyn I. Marquis
*Attorney, Agent, or Firm*—Robert Spector

[57] ABSTRACT

The curable resin composition of the present invention consists of a curable resin and the spherical microparticles of cured silicone rubber obtained by the curing of an addition reacting silicone rubber composition, wherein the silicone rubber composition also contains an epoxy compound having an aliphatically unsaturated group. Furthermore, because the microparticles are prepared from an aqueous emulsion or aqueous dispersion of the silicone rubber composition, it has an extremely small particle size.

3 Claims, No Drawings

CURABLE RESIN COMPOSITION CONTAINING A MICROPARTICULATE SILICONE RUBBER

BACKGROUND OF THE INVENTION

1. Field of the Invention

This invention relates to a curable resin composition. More particularly, this invention relates to a curable resin composition containing a microparticulate form of silicone rubber. The composition exhibits an improved fluidity during molding, and converts to a cured material which itelf has an excellent flexibility, a low thermal expansion coefficient, a low mold shrinkage ratio and exhibits excellent adhesion between said resin and the silicone rubber particles.

2. Description of the Prior Art

Curable resin compositions have excellent electrical properties, for example, dielectric properties, volume resistivity, and dielectric breakdown strength, in addition to excellent mechanical properties, for example, flexural strength, compression strength, and impact strength. These properties make the compositions particularly desirable for use as insulating materials for various types of electric and electronic components. These materials are fabricated using methods such as transfer molding, injection molding, potting, casting, powder coating, immersion coating and dipping.

Cured resins prepared using the aforementioned compositions are generally rigid and when used, for example, to seal an electric or electronic component, large mechanical stresses are imparted to the interal elements of the component. As a consequence, the element may not function properly or failure may occur in part of the element. One cause of these undesirable features is the difference in thermal expansion coefficient and post-molding shrinkage ratio between the elements of electric and electronic components and curable resins. The elements of electric and electronic components have very low thermal expansion coefficients and shrinkage ratios while the resins have large values for these properties.

The large differences in thermal expansion and shrinkage ratios are why the elements of electric and electronic components as well as other constituent materials are subjected to excessively large internal stresses during the heating required to seal the component, post-cure the resin or the thermal cycling to which the component is subjected during testing and use. Furthermore, these differences in thermal expansion coefficients and shrinkage ratios cause cracks in the resin itself and also cause the appearance of gaps between the electric or electronic component and the resin. The infiltration of water and other undesirable materials into these gaps contributes to deterioration of the elements.

Previous attempts to improve the properties of curable resins have not had as their objective a reduction in the thermal expansion coefficient or post-molding shrinkage rato of the curable resins. For example, Japanese Patent Publication Number 52-36534 [36,534/77] relates to an improvement in the lubricating properties of the surfaces of resin moldings achieved by the addition of an organopolysilsesquixone powder to phenolic resins. Japanese Patent Application Laid Open [Kokai] Number 52-14643 [14,643/77] relates to an improvement in the abrasion resistance to metals which is obtained by filling synthetic resin with the microparticles obtained from a cured material based on a organopolysiloxane and an inorganic filler. The thermal expansion coefficient, post-molding shrinkage ratio, and flexural modulus are unsatisfactory in both of the aforementioned resin compositions.

In Japanese Laid Open Patent Application Number 58-219218 [219,218/83] the present inventors propose a solution to the foregoing problem by adding to the curable resin a cured material containing at least 10 weight % of a straight-chain siloxane fraction. The material is reduced to a microparticulate from following curing. However, the problem with this approach that it is not always easy to reduce an elastomeric cured material to the microparticulate form.

The present inventors in Japanese Laid Open Patent Application Number 59-96122 [96,122/84] propose using the spherical cured material obtained by spraying a curable elastomer composition into a current of heated air. This is a quite excellent method, but suffers from the problem of high costs due to the equipment necessary to produce the spherical cured material.

In view of the aforementioned problems associated with prior art methods, an objective of the present invention is to provide a curable resin composition which exhibits an excellent fluidity during molding, which will neither stain the metal mold nor exude onto the surface of the cured material, has an excellent mold-releasability, and which converts to a cured material having excellent flexibility, a low thermal expansion coefficient, and a low mold shrinkage ratio and in which adhesion between the resin and spherical silicone rubber microparticles is excellent.

SUMMARY OF THE INVENTION

The objectives of this invention can be achieved by uniformly dispersing into a curable resin a spherical silicone rubber powder produced by a "wet" method described hereinafter. This spherical silicone rubber powder offers the advantage of easier production than by spraying a curable composition into heated air, as well as the potential for mass production, and the ease of production of small uniform particles.

DETAILED DESCRIPTION OF THE INVENTION

This invention provides an improved curable resin composition comprising
(I) 10 parts by weight of a curable resin and
(II) 0.1 to 100 parts by weight of a silicone rubber in the form of spherical microparticles that are uniformly dispersed throughout said resin, where the improvement comprising the presence of silicone rubber microparticles obtained by the following sequence of steps:
  (1) preparing a curable mixture comprising
   (A) 100 parts by weight of an organopolysiloxane having a least two silicon-bonded lower alkenyl groups in each molecule,
   (B) from 0.3 to 100 parts by weight of an organohydrogenpolysiloxane having at least two silicon-bonded hydrogen atoms in each molecule, and
   (C) from 0.1 to 50 parts by weight of an aliphatically unsaturated group-containing epoxy compound in the presence of
   (D) an amount of a platinum-containing catalyst sufficient to promote curing of said silicone rubber,
  (2) preparing an emulsion comprising said mixture as the dispersed phase and water as the continuous phase at a temperature of from 0° to 25° C. and (3) curing said emulsion by dispersing it in a liquid or gas maintained at a temperature above that of said water.

Each ingredient of the present curable compositions will now be explained in detail.

I. THE CURABLE RESIN

The curable resin comprising ingredient (I) is the base material of the present composition, and all curable resins. known in the art can be used here. Examples are phenolic resins, formaldehyde resins, xylene resins, xylene/formaldehyde resins, ketone/formaldehyde resins, furan resins, imide resins, melamine resins, alkyd resins, unsaturated polyester resins, aniline resins, sulfonamide resins, silicone resins, epoxy resins, and the copolymer obtained be reacting two or more of these resins.

Phenolic, imide, epoxy, and silicone resins are preferred. It should be pointed out that silicone resins are typically non-elastomeric hydrolysis reaction products of two or more halosilanes, and are a different class of materials from the cured elastomers present in the particles that constitute ingredient II of the present compositions.

Ingredient I can be a single resin or a mixture of two or more resins. Furthermore, ingredient I encompasses not only resins which cure by the application of heat, but also those cured by exposure to high-energy radiation, for example, ultraviolet energy and gamma radiation. These resins are liquid at room temperature. In addition to the resin itself, curing agents, curing catalysts, photosensitizers, fillers, the metal salts of higher fatty acids, ester waxes, platicizers, and other additives and/or modifiers can be present.

II. THE CURABLE ORGANOSILOXANE COMPOSITION

THE ORGANOPOLYSILOXANE (INGREDIENT A)

The organopolysiloxane identified hereinbefore as ingredient A is the principal material of the curable composition referred to herein as ingredient II. This ingredient can be any organopolysiloxane containing at least two silicon-bonded lower alkenyl groups in each molecule. The molecular configuration of this ingredient is preferably straight chain, however partially branched or network configurations are also permissible.

The viscosity of ingredient A at 25 degrees Centigrade can range from 10 centipoise up to but not including that of a gum. The cured microparticle is brittle when the viscosity of ingredient A is below 10 centipoise, and it is difficult to prepare an emulsion when ingredient A is a gum. As a consequence, the viscosity of ingredient A is preferably 50 to 100,000 centipoise and particularly preferably 50 to 10,000 centipoise.

The organic groups bonded to silicon in the siloxane units of ingredient A are monovalent hydrocarbon or halogenated hydrocarbon groups. These groups can be identical or different. The groups are exemplified by but not limited to alkyl such as methyl, ethyl, propyl, and butyl; cycloalkyl such as cyclohexyl; lower alkenyl such as vinyl, and allyl; aryl such as phenyl and xylyl; aralkyl such as phenylethyl; and halogenated hydrocarbon such as gamma-chloropropyl and 3,3,3-trifluoropropyl.

The required lower alkenyl groups of ingredient A can be located anywhere within the molecule. The lower alkenyl groups are preferably present on at least the terminal positions of the molecule, although not restricted to this location. The lower alkenyl group is preferably vinyl.

The terminal groups present on ingredient A are exemplified by triorganosilyl groups such as trimethylsilyl, dimethylvinylsilyl, dimethylphenylsilyl, methylvinylphenylsilyl, hydroxyl groups and alkoxy groups.

The selection of the types of monovalent hydrocarbon groups in the siloxane units, the nature of the molecular chain end-blocking groups, and the viscosity of ingredient A will be based on the intended application for the curable organosiloxane composition.

While the use of only straight-chain organopolysiloxane as ingredient A is preferred, the use of both a straight-chain organopolysiloxane and an organopolysiloxane resin is also possible.

The Organohydrogenpolysiloxane (Ingredient B)

The organohydrogenpolysiloxane comprising ingredient B is a crosslinker which cures the silicone rubber by means of an addition reaction with the lower alkenyl groups of ingredient A under the catalytic activity of ingredient D.

The configuration of this organohydrogenpolysiloxane can be straight chain, cyclic or branched straight-chain, and this organohydrogenpolysiloxane can be a homopolymer or copolymer. It contains at least 2 siliconbonded hydrogen atoms in each molecule and has a viscosity at 25° C. within the range of 1 to 10,000 centipoise. Linear and cyclic molecules are preferred.

Other than hydrogen atoms, the organic groups bonded to silicon comprise monovalent hydrocarbon and halohydrocarbon groups, as exemplified by methyl, ethyl, butyl, phenyl, and 3,3,3-trifluoropropyl. Methyl is particularly preferred among these. Ingredient B is typically present in an amount equivalent to from 0.5 to 5, preferably from 0.7 to 2 silicon-bonded hydrogen atoms for each silicon-bonded alkenyl group in component (A). Because ingredient C, an aliphatically unsaturated epoxy-substituted organic compound, also reacts with ingredient B, the concentration of ingredient B should be within the range of 0.3 to 100 weight parts per 100 weight parts ingredient A.

The Aliphatically Unsaturated Epoxy-Containing Compound

(Ingredient C)

The function of the aliphatically unsaturated epoxy group-containing organic compound comprising ingredient C is to increase both the affinity and the adhesion between the curable resin comprising ingredient I and the spherical silicone rubber microparticles, also referred to herein as a micropowder, comprising component II. Any compound containing at least 1 aliphatically unsaturated group and at least 1 epoxy group in each molecule can be used as ingredient C. Examples of this ingredient include but are not limited to allyl glycidyl ether, vinylcyclohexane monoxide, glycidyl acrylate, glycidyl methacrylate, and compounds of the formulae

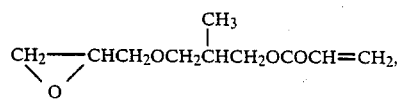

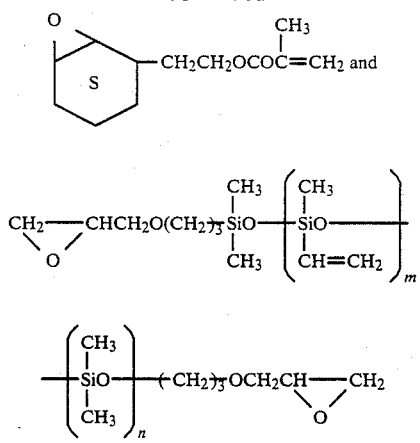

where m and n are positive integers.

The concentration of ingredient C can range from 0.1 to 50 parts by weight per 100 parts by weight of ingredient A.

In accordance with one embodiment of this invention ingredient (C) can be reacted with a stoichiometric excess of ingredient B and the resultant product combined with ingredient A and a platinum-containing catalyst to form a curable composition of this invention.

The Platinum-Containing Catalyst (Ingredient D)

The platinum-type catalyst comprising ingredient D is exemplified by finely divided elemental platinum, finely divided platinum dispersed on carbon powder, chloroplatinic acid, chloroplatinic acid/olefin coordination compounds, chloroplatinic acid, vinylsiloxane coordination compounds, tetrakis(triphenylphosphine)-palladium, and rhodium catalysts. The addition of platinum-type catalyst is to fall within the range of 0.1 to 1,000 and preferably 0.5 to 200 weight parts as the metal for each 1,000,000 weight parts of ingredient A.

Optional Ingredients

In addition to the ingredients A through D discussed in the preceding specification, the cured silicone rubber particles used as ingredient II may contain a filler in order to adjust the fluidity and increase the mechanical strength of the molded product. Such fillers are exemplified by reinforcing fillers such as precipitated silica, fumed silica, calcined silica, and fumed titanium oxide, as well as by nonreinforcing fillers such as quartz powder, diatomaceous earth, asbestos, aluminosilicic acid, iron oxide, zinc oxide, and calcium carbonate.

These fillers can be used directly or after a surface treatment with an organosilicon compound such as hexamethyldisilazane, trimethylchlorosilane, or polydimethylsiloxane.

So long as the objective of the present invention is not adversely affected, the curable silicone rubber composition used to prepare ingredient II can contain small or very small quantities or acetylenic compounds, hydrazines, triazoles, phosphines, mercaptans, or other known curing reaction inhibitors. Other permissible additives include but are not limited to pigments, heat stabilizers, flame retardants, plasticizers, and organopolysiloxanes having 1 alkenyl group in each molecule, the latter for the purpose of reducing the modulus of the cured silicone rubber.

It is preferred that the ingredients of the curable silicone rubber composition used to prepare ingredient II be mixed blended at low temperatures. The mixing temperature in the range of minus 60 degrees Centigrade to plus degrees Centigrade and preferably in the range of minus 30 degrees Centigrade to zero degrees Centigrade. The basis for this is that the curing reaction will proceed during blending when the temperature exceeds plus 5 degrees Centigrade, while at below minus 60 degrees Centigrade ingredient A tends to gel. In either case, it is difficult to prepare a homogeneous emulsion.

The curable silicone rubber composition is converted into an emulsion in the presence of water alone or a mixture of water and a surfactant, preferably at zero degrees Centigrade to 25 degrees Centigrade using a colloid mill or homogenizer.

Water freezes at below zero degrees Centigrade, thereby preventing emulsion formation, while curing of the silicone rubber composition will proceed at above 25 degrees Centigrade, resulting in silicone rubber particles of arbitrary and indeterminate shapes.

The emulsified curable silicone rubber composition prepared as described hereinabove is then cured to yield spherical microparticles by dispersing the composition into water or a nonaqueous medium whose temperature exceeds that of the aqueous phase of the emulsion. The medium can be a liquid or a gas and is maintained at a temperature that is preferably at least 50 degrees Centigrade. Water is the preferred medium for this step of the present method.

The spherical microparticles produced in accordance with the present method generally will not exceed 1 millimeter in diameter. However, because the above-described production method is capable of producing an ultrafine spherical micropowder, particles having diameters no larger than 100 microns are preferred for use in the present invention, and particle diameters no larger than 50 microns are particularly preferred from the standpoint of improving the fluidity during molding of resin composition containing these microparticles.

The spherical microparticles used in the present invention can included some particles with modified shapes, for example, ellipsoids.

It is essential that ingredient II of the present curable resin compositions be uniformly dispersed in ingredient I of the present curable resin compositions.

The present compositions typically contain from 0.1 to 100 weight parts of ingredient II per 100 weight parts of ingredient I. The effect of the present invention is not fully evident at concentrations below 0.1 part of ingredient II, while the presence of more than 100 parts results in a deterioration in the physical properties of the cured resin composition. The preferred range of addition is from 0.5 to 70 parts. Ingredients I and II be mixed at any stage and any mixing device can be used.

The following examples are intended to describe preferred embodiment of the present invention and should not be interpreted as limiting the scope of the invention as defined in the accompanying claims. Unless otherwise specified all parts and percentage specified in the examples are by weight and viscosities were measured at 25 degrees C.

The properties of the cured materials were measured using the following standards and methods.
  (1) Thermal expansion coefficient: the sample was post-cured at 180 degrees Centigrade for 5 hours and measured according to ASTM test procedure D-696.

(2) Flexural modulus: determined by the flexural test method of JIS K6911.

(3) Mold shrinkage ratio: determined by JIS K-6911 on the molding prepared by molding in a metal mold, cooling to room temperature, post-curing according to the conditions in the particular example, and then cooling to room temperature.

(4) Spiral flow: measured according to the EMMI standard on the molding prepared according to the conditions in the particular example.

(5) Scanning Electron Microscope observations: the fracture surface of the test specimen from item (2) was inspected using the electron micrograph, and the affinity (adhesion) between component (ii) and the thermosetting resin was evaluated in terms of the presence or absence of gaps.

(6) Water absorption: expressed as the weight change of a 2×½×¼ inch (50.8×6.4 mm) molding which had been post-cured and then immersed in boiling water for 10 hours.

Production of Ingredient II

Preparation of Spherical Mcropowders A and A1

4 Parts allyl glycidyl ether and 8 parts vinylcyclohexene monoxide (ingredient C) and 31 parts methylhydrogenpolysiloxane (ingredient B) having the formula

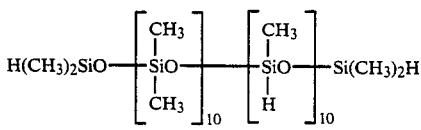

were mixed at minus 10 degrees Centigrade into 50 parts of a dimethylvinylsiloxy-terminated dimethylpolysiloxane having a viscosity of 800 centipoise (ingredient A). A second mixture was prepared by mixing at minus 10 degrees Centigrade 50 parts of ingredient A and an amount of isopropanolic chloroplatinic acid solution equivalent to 20 ppm of platinum, based on the total weight of ingredient A. The two mixtures were rapidly blended with each other, and the product was then transferred to a colloid mill which had been cooled to 5 degrees Centigrade. A homogeneous emulsion was prepared by blending this mixture with 600 parts ion exchanged water and 10 parts of a surfactant (Tergitol TMN-6 from Union Carbide Corporation), both of which had both been cooled to 5 degrees Centigrade. This emulsion was cured into spherical silicone rubber microparticles by pouring it into hot water at 85 degrees Centigrade with stirring.

After washing the particles with water and drying, inspection under the electron microscope revealed that the microparticles were spherical in shape and ranged from 1 to 10 microns in diameter. This product was designated as spherical micropowder A.

As a comparison example, a spherical micropowder A1 was prepared using the same procedure as for A, with the modifications that the allyl glycidyl ether and vinylcyclohexene monoxide (ingredient C) were omitted from the above composition and only 5 parts of the methylhydrogenpolysiloxane was added instead of 31 parts.

Preparation of Spherical Micropowders B and B1

20 Parts of a trimethylsiloxy-terminated methylhydrogenpolysiloxane having a viscosity of 10 centipoise (ingredient B) and 5 parts allyl glycidyl ether and 5 parts vinylcyclohexene monoxide (ingredient C) were mixed at minus 10 degrees Centigrade into 50 parts of a dimethylvinylsiloxy-terminated dimethylpolysiloxane having a viscosity of 1,000 centipoise (ingredient A). A second mixture was also prepared by blending at minus 10 degrees Centigrade 50 parts of ingredient A and isopropanolic chloroplatinic acid solution in an amount equivalent to 20 ppm of platinum based on the total weight of ingredient A. These two mixtures were rapidly blended and then transferred to a colloid mill which had been cooled to 5 degrees Centigrade. A homogeneous emulsion was prepared by blending this mixture with 600 parts ion-exchanged water and 20 parts surfactant (Tergitol TMN-6 from the Union Carbide Corporation) which had both been cooled to 5 degrees Centigrade. This emulsion was cured into a spherical silicone rubber micropowder by pouring it with stirring into water heated to 85 degrees Centigrade. After washing with water and drying, inspection under the electron microscope confirmed the presence of a spherical micropowder having particle diameters of 1 to 8 microns. This was designated as spherical micropowder B.

As a comparison example spherical micropowder B1 was prepared using the same procedure described for micropowder B, with the modifications that the allyl glycidyl ether and vinylcyclohexene monoxide comprising ingredient C were omitted from the composition and only 5 parts of the methylhydrogenpolysiloxane was added instead of 20 parts.

Preparation of Spherical Micropowders C AND C1

8 Parts allyl glycidyl ether (ingredient C) and 20 parts trimethylsiloxy-terminated methylhydrogenpolysiloxane having a viscosity of 10 centipoise (ingredient B) were mixed at minus 10 degrees Centigrade into 50 parts dimethylvinylsiloxy-terminated dimethylpolysiloxane having a viscosity of 500 centipoise (ingredient A). A second mixture was also prepared by blending at minus 10 degrees Centigrade 50 parts of ingredient A and an amount of isopropanolic chloroplatinic acid solution equivalent to 20 ppm as platinum based on the total weight of ingredient A. These two mixtures were rapidly blended and then transferred to a colloid mill which had been cooled to 5 degrees Centigrade. A homogeneous dispersion was then prepared without the use of surfactant by blending this mixture and 600 parts ionexchanged water which had been cooled to 5 degrees Centigrade. The resultant composition was cured into spherical silicone rubber microparticles by pouring the composition with stirring into water maintained at 85 degrees Centigrade.

Examination of the resultant microparticles with a scanning electron microscope confirmed the presence of spherical microparticles having a slightly broadened particle size range of from 5 to 30 microns (micropowder C).

As a comparison example, spherical micropowder C1 was prepared using the same ingredients and procedures as for microparticles C, with the exception that the allyl glycidyl ether comprising ingredient C was omitted from the above composition and only 5 parts of the methylhydrogenpolysiloxane were added instead of 20 parts.

Preparation of Indeterminately Shaped Micropowders D AND D1

In this comparison example, the same composition used to prepare spherical micropowder A was placed directly into an oven at 100 degrees Centigrade and cured by heating it for 1 hour. The cured product was pulverized in a grinder. The microparticles passing through a 100-mesh screen were designated as indeterminately shaped micropowder D.

The same commposition as used for spherical micropowder A1 was similarly thermally cured and pulverized, and the microparticles passing through a 100-mesh screen were designated as indeterminately shaped micropowder D1.

Preparation of dry-method spherical micropowder E1

In this comparison example, 0.1 part 3-methyl-1-butyne-3-ol as a reaction inhibitor was blended into the same composition as used for spherical micropowder B1, and this blend was cured by spraying into a spray wherein the air temperature wa 230 degrees Centigrade. The resultant spherical micropowder had particle diameters of 10 to 150 microns. This product was designated as dry-method spherical micropowder

EXAMPLE 1

31 Parts of a phenol novoloc resin (softening point=80 degrees Centigrade, hydroxyl group equivalent weight=100), 8 parts spherical micropowder A, 69 parts fused quartz powder, 4 parts hexamethylenetetramine, and 1 part carnauba wax were kneaded on a hot roll at 90 degrees Centigrade, followed by pulverization to yield a thermosetting phenol novolac resin composition. This resin composition was then transfer molded at a temperature of 175° C. for 3 minutes under a pressure of 70 Kg/cm2 and was post-cured at 150 degrees Centigrade for 2 hours. The various properties of this molding are reported in Table 1.

For purposes of comparison moldings were similarly prepared as above, either using 8 parts spherical microparticles A1 in place of spherical micropowder A of Example 1 or without the addition of any spherical microparticles. The properties of these moldings were measured, and the results are reported in Table 1.

TABLE 1

| Composition and Properties | Example 1 | Comparison 1 | Comparison 2 |
|---|---|---|---|
| (i) phenol novolac resin (parts) | 31 | 31 | 31 |
| (ii) spherical micropowder (parts) | | | |
| A | 8 | — | — |
| A1 | — | 8 | — |
| mold shrinkage ratio (%) | 0.07 | 0.10 | 0.27 |
| spiral flow (inch) | 29 | 26 | 27 |
| flexural modulus (kg/mm$^2$) | 980 | 1070 | 1470 |
| thermal expansion coefficient ($\times 10^5$/°C.) | 0.3 | 0.4 | 1.7 |
| Gaps Present | none | yes | — |
| water absorption (%) | 0.42 | 0.48 | 0.33 |

EXAMPLE 2

21 Parts cresol novolac epoxy resin (softening point=80 degrees Centigrade, epoxy equivalent weight=220), 10 parts of the phenol novolac resin described in Example 1, 15 parts spherical micropowder B described in the preceding specification, 70 parts fused silica, 0.4 parts carnauba wax, and 0.2 parts 1,8-diazabicyclo[5,4,0]-7-undecene were combined and kneaded on a hot roll at 90 degrees Centigrade, followed by pulverization to prepare a thermosetting epoxy resin composition. This resin composition was transfer molded for two minutes at 175 degrees Centigrade under a pressure of 70 kg/cm2 and then post-cured at 180 degrees Centigrade for 12 hours. The various properties of this molding are reported in Table 2.

In the comparison examples, moldings were similarly prepared as above, either using 15 parts of micropowder B1 in place of spherical micropowder B or without the addition of any spherical micropowder. The various properties of these moldings were measured and the results are reported in Table 2.

TABLE 2

| Composition and Properties | Example 2 | Comparison Example 3 | Comparison Example 4 |
|---|---|---|---|
| (i) cresol novolac epoxy resin (parts) | 21 | 21 | 21 |
| phenol novolac resin (parts) | 10 | 10 | 10 |
| (ii) spherical micropowder (parts) | | | |
| B | 15 | — | — |
| B1 | — | 15 | — |
| mold shrinkage ratio (%) | 0.17 | 0.19 | 0.48 |
| spiral flow (inch) | 38 | 35 | 39 |
| flexural modulus (kg/mm$^2$) | 650 | 710 | 1380 |
| thermal expansion coefficient ($\times 10^5$/°C.) | 1.2 | 1.3 | 2.5 |
| gaps present | none | yes | — |
| water absorption (%) | 0.29 | 0.35 | 0.26 |

EXAMPLE 3

6 Parts spherical micropowder C described in the preceding specification, 68 parts fused quartz powder, 0.15 parts aluminum acetylacetonate, and 1 part carnauba wax were kneaded on a hot roll at 90 degrees Centigrade into 16 parts cresol novolac epoxy resin (softening point = 80 degrees Centigrade, epoxy equivalent weight=220) and 16 parts methylphenylpolysiloxane resin composed of 40 mole % $CH_3SiO_{1.5}$ units, 10 mole % $C_6H_5(CH_3)SiO$ units, 40 mole % $C_6H_5SiO_{1.5}$ units, and 10 mole % $(C_6H_5)_2SiO$ units and containing 3 weight % OH groups directly bonded to silicon. The composition was removed from the roll and pulverized to yield a thermosetting silicone/epoxy resin composition. This resin composition was then transfer molded at 175° C. for 2 minutes at 70 kg2/cm2 and post-cured at 180° C., for 12 hours. The various properties of this molding were measured, and the results are reported in Table 3.

In the comparison examples, moldings were similarly prepared as above, using either 6 parts of micropowder C1 in place of spherical micropowder C or without the addition of any spherical microparticulate silicone rubber. The various properties of these moldings were measured, and the results are reported in Table 3.

TABLE 3

| Composition and Properties | Example 3 | Comparison Example 5 | Comparison Example 6 |
|---|---|---|---|
| (I) Silicone epoxy resin (parts) | 16 16 | 16 16 | 16 16 |
| (II) spherical micropowder (parts) | | | |

TABLE 3-continued

| Composition and Properties | Example 3 | Comparison Example 5 | Comparison Example 6 |
|---|---|---|---|
| C | 6 | — | — |
| C1 | — | 6 | — |
| mold shrinkage ratio (%) | 0.34 | 0.45 | 0.55 |
| spiral flow (inch) | 41 | 38 | 42 |
| flexural modulus (kg/mm$^2$) | 1010 | 1160 | 1340 |
| thermal expansion coefficient ($\times 10^5$/°C.) | 2.3 | 2.5 | 3.2 |
| Gaps | none | yes | — |
| water absorption (%) | 0.48 | 0.54 | 0.44 |

EXAMPLE 4

Transfer molding was carried out as described in Example 1 on compositions using either 8 parts of E1 or 8 parts of the mechanically ground, indeterminately shaped micropowder D or D1. The cured moldings were inspected for the occurrence of gaps, measured for their water absorption, and the results are reported in Table 4. Some values from Table 1 are provided for comparison (Example 4 in Table 4 corresponds to the preceding Example 1).

TABLE 4

| Composition and Properties | Example 4 | Comparison Example 7 | Comparison Example 8 | Comparison Example 9 |
|---|---|---|---|---|
| (i) phenol novolac resin (parts) | 31 | 31 | 31 | 31 |
| (ii) spherical micropowder A (parts) | 8 | — | — | — |
| indeterminately shaped micropowder (parts) | — | 8 | — | — |
| D | — | — | 8 | — |
| D1 | — | — | — | 8 |
| dry-method spherical micropowder E1 (parts) | — | — | — | — |
| spiral flow (inch) | 29 | 15 | 16 | 23 |
| gaps present | none | — | — | yes |
| water absorption (%) | 0.42 | 0.42 | 0.47 | 0.49 |

EXAMPLE 5

6 Parts of spherical micropowder B, 69 parts fused quartz powder, 0.6 parts carnauba wax, and 0.25 parts aluminum benzoate were kneaded into 31 parts thermosetting polyimide resin BT2480 rom Mitsubishi Gas Chemical Company using a roll mill heated to 90° C. The composition was removed from the roll and pulverized to yield a thermosetting polyimide resin composition. This resin composition was then transfer molded at 220 degrees Centigrade for 4 minutes under a pressure of 70 kg/cm2 and then post-cured at 230 degrees Centigrade for 3 hours. Various properties of this molding were measured, and the results are reported in Table 5.

In the comparison examples, moldings were prepared under the same conditions as above, but using 6 parts of the indeterminately shaped micropowder D or D1 or 6 parts of dry-method spherical micropowder E1 in place of spherical microparticles B. The spiral flow times of the resultant compositions were measured and the cured products were analyzed for water absorption and inspected for the occurrence of gaps. The results of these evaluations are reported in Table 5.

TABLE 5

| Composition and Properties | Example 5 | Comparison Example 10 | Comparison Example 11 | Comparison Example 12 |
|---|---|---|---|---|
| (i) polyimide resin (parts) | 31 | 31 | 31 | 31 |
| (ii) spherical micropowder B (parts) | 6 | — | — | — |
| indeterminately shaped micropowder (parts) | | | | |
| D | — | 6 | — | — |
| D1 | — | — | 6 | — |
| dry-method spherical micropowder E1 (parts) | — | — | — | 6 |
| spiral flow (inch) | 52 | 40 | 38 | 43 |
| Gaps Present | none | — | — | yes |
| water absorption (%) | 0.48 | 0.47 | 0.53 | 0.54 |

Spherical microparticles of silicone rubber that are prepared in accordance with the present invention are characterized by an excellent adhesion and affinity for the curable resin, and, moreover, when these spherical microparticles are dispersed in the curable resin, the molding obtained from the curable resin composition exhibits less water infiltration than in the case of the prior ground, indeterminately shaped silicone rubber powders or spherical cured silicone rubber powders. Furthermore, such moldings have an excellent flexibility, low thermal expansion coefficient, and low post-molding shrinkage ratio.

The present curable resin compositions are thus particularly useful for the preparation of precision moldings, and also as sealants, casting agents, coatings and powder coatings for various electric and electronic components such as transistors, integrated circuits, diodes, thermistors, transformer coils and resistors.

That which is claimed is:

1. A curable resin composition comprising
   (I) 100 parts by weight of a curable resin and
   (II) 0.1 to 100 weight parts of spherical microparticulate silicone rubber obtained by curing an emulsified composition comprising
      (A) 100 parts by weight of an organopolysiloxane having at least two silicon-bonded vinyl or allyl groups in each molecule,
      (B) from 0.3 to 100 parts by weight of an organohydrogenpolysiloxane having at least two silicon-bonded hydrogen atoms in each molecule, and
      (C) from 0.1 to 50 parts by weight of an organic compound containing at least one epoxide group and at least one aliphatically unsaturated hydrocarbon group per molecule,
      (D) an amount of a platinum-containing catalyst sufficient to promote curing of said organopolysiloxane,
   where the continuous phase of said emulsion is water or a mixture of water and a surfactant, said emulsion is maintained at a temperature of from 0° to 25° C. prior to curing said composition, and said composition is cured by dispersing said emulsion into a liquid of gaseous medium maintained at a temperature above that of said emulsion.

2. A curable resin composition according to claim 1 where the viscosity of ingredient A is from 0.05 to 100 Pa.s at 25° C., the viscosity of ingredient B is from 0.001 to 10 Pa.s, ingredient C is allyl glycidyl ether, vinylcyclohexene monoxide, glycidyl acrylate, glycidyl methacrylate, or a compound of the formula

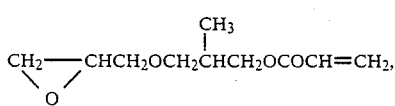

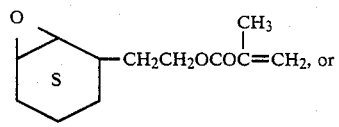

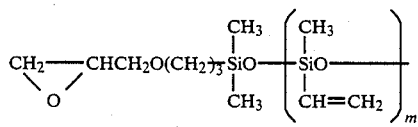

-continued

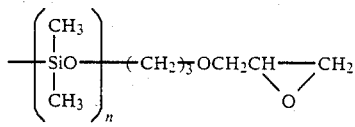

where m and n are positive integers, the ingredients of said curable mixture are blended at a temperature of from −60 to +5° C., said emulsion contains a surfactant and is cured by dispersing it into a heated liquid, the diameter of said microparticulate silicone rubber is less than 100 microns, and the concentration of said microparticulate silicone rubber in said curable resin composition is from 0.5 to 70 parts.

3. A composition according to claim 2 wherein the viscosity of ingredient A is from 0.05 to 10 Pa.s, the organic groups present in said organopolysiloxane are methyl and vinyl, said curable mixture contains a filler, said emulsion is cured by dispersing it in a liquid maintained at a temperature of at least 50° C.

* * * * *